United States Patent [19]

Bussard

[11] 4,370,295
[45] Jan. 25, 1983

[54] FUSION-FISSION POWER GENERATING DEVICE HAVING FISSILE-FERTILE MATERIAL WITHIN THE REGION OF THE TOROIDAL FIELD COILS GENERATING MEANS

[75] Inventor: Robert W. Bussard, Arlington, Va.

[73] Assignee: FDX Associates, L.P., La Jolla, Calif.

[21] Appl. No.: 157,346

[22] Filed: Jun. 9, 1980

Related U.S. Application Data

[63] Continuation of Ser. No. 888,804, Mar. 21, 1978, abandoned.

[51] Int. Cl.³ .............................................. G21B 1/00
[52] U.S. Cl. .................................... 376/133; 376/142; 376/146; 148/31.57
[58] Field of Search ................ 176/1, 3, 9; 75/123 H; 148/31.57, 31.55; 335/296, 302; 336/229, DIG. 3

[56] References Cited

U.S. PATENT DOCUMENTS

| | | | |
|---|---|---|---|
| 3,117,912 | 1/1964 | Imhoff et al. | 176/9 |
| 3,546,030 | 12/1970 | Buschow et al. | 148/31.57 |
| 3,639,181 | 2/1972 | Cech | 148/31.57 |
| 3,748,226 | 7/1973 | Ribe et al. | 176/9 |
| 4,149,931 | 4/1979 | Christensen | 176/9 |

OTHER PUBLICATIONS

Proc. of the 7th Symp. on Eng. Prob. of Fusion Research, vol. 1, 10/77, pp. 193-197.
PIFR-863, 11/76, Benford et al., pp. VII, 1, 9, 10.
Nuclear Technology, vol. 29, 6/76, Fon Su et al., pp. 392-405.
ERDA-4, Dec. 1974.
CONF-760733, 7/76.
ANL/CTR-76-3, vol. 1 and 2, 8/76.

*Primary Examiner*—Harvey E. Behrend
*Attorney, Agent, or Firm*—Schwartz, Jeffery, Schwaab, Mack, Blumenthal & Koch

[57] ABSTRACT

A fusion-fission reactor having a plasma containing toroidal fusion region for producing high energy neutrons from fusion reactions and a region external to the fusion region containing material which is both fissile with respect to high energy neutrons and fertile with respect to low energy neutrons. The device comprises a toroidal field generating means and a region of fissile-fertile material positioned within the region of the toroidal field generating means. The toroidal field generating means is positioned substantially adjacent the toroidal fusion region.

12 Claims, 8 Drawing Figures

4,370,295

FUSION-FISSION POWER GENERATING DEVICE HAVING FISSILE-FERTILE MATERIAL WITHIN THE REGION OF THE TOROIDAL FIELD COILS GENERATING MEANS

This is a continuation of application Ser. No. 888,804, filed Mar. 21, 1978, now abandoned.

BACKGROUND OF THE INVENTION

1. Field of the Invention

The invention is in the field of fusion-fission reactor design and particularly directed toward an integrated toroidal field/blanket structure for optimizing reactor power output.

2. Description of the Prior Art

Numerous theoretical and conceptual studies have been made of fusion-fission reactor designs. In most cases the d,t fusion reaction is utilized to generate high energy neutrons which cause fission reactions in a surrounding blanket of fissile-fertile material. These fission reactions generate additional neutrons as well as release a substantial amount of energy on the order 200 Mev per fission. Low energy neutrons additionally react in the blanket to produce fissile material which itself produces fission energy upon subsequent reaction with fast or slow neutrons. Reference is made to recent fusion-fission studies as reported in *DCTR Fusion-Fission Energy Systems Review Meeting*, Dec. 3–4, 1974, ERDA-40, and *Proceedings: U.S.-U.S.S.R. Symposium on Fusion-Fission Reactors*, July 13–16, 1976, CONF-760733, incorporated herein by reference. These prior art studies have typically utilized conventional designs for achieving thermonuclear controlled reactions which have been modified to include the blanket of fissile-fertile material surrounding the fusion region. For some cases, such as the Tokomak hybrid designs, the fissile-fertile blanket has been positioned adjacent the plasma region with large toroidal field coils surrounding the entire fusion region including a magnet shield used to protect the TF coils. In other studies the fissile-fertile blanket is located exterior to the outer radius of the toroidal field coils. A lithium breeding section is usually provided in order to generate tritium to replace that used in the d,t reaction.

SUMMARY OF THE INVENTION

It is an object of the invention to provide a highly efficient fusion-fission power generating device.

A further object of the invention is to provide a fusion-fission power generating device of the toroidal configuration wherein the toroidal field coils are positioned immediately adjacent the toroidal plasma containment region and fissile-fertile material is positioned within the region of the toroidal field coils.

Yet a further object of the invention is to provide an improved modular fusion-fission generating device wherein a fusion-fission power core is separable from a surrounding moderator/blanket means and may be replaced by a replacement fusion-fission power core.

In accordance with the principles of the invention there is provided a fusion-fission reactor having a plasma containing toroidal fusion region for producing high energy neutrons from fusion reactions and a region external to the fusion region containing material which is both fissile with respect to high energy neutrons and fertile with respect to low energy neutrons. The reactor comprises a toroidal field generating means, a region of fissile-fertile material positioned within a region of the toroidal field generating means, and the toroidal field generating means are positioned substantially adjacent the toroidal fusion region.

There is also provided in accordance with the teachings of the invention a fusion-fission power generating means having a plasma containing toroidal fusion region for producing high energy neutrons from fusion reactions and a region external to the fusion region containing material which is both fissile with respect to high energy neutrons and fertile with respect to low energy neutrons. The generating means comprises a fusion-fission power core, and a modulator/reflector means positioned proximate the fusion power core. The fusion-fission power core is separable from the power generating means whereby the fusion-fission power core may be removed from the power generating means and replaced by a replacement fusion-fission power core. The fusion-fission core comprises a toroidal field generating means, a region of fissile-fertile material positioned with a region of the toroidal field generating means, the toroidal field generating means being positioned substantially adjacent the toroidal fusion region and means for containing the toroidal field generating means.

A method is also disclosed of increasing the efficiency of operation of a fusion-fission power generating device having a plasma containing fusion region for generating high energy neutrons from fusion reactions and a region external to the fusion region containing material which is both fissile with respect to high energy neutrons and fertile with respect to low energy neutrons. The method comprises the steps of positioning toroidal field generating means substantially adjacent the toroidal fusion region and incorporating fissile-fertile material within a region of the toroidal field generating means.

BRIEF DESCRIPTION OF THE DRAWINGS

These and other objects of the invention will become apparent in reference to the specification and drawings wherein.

DETAILED DESCRIPTION OF THE PREFERRED EMBODIMENT

Figure 1:
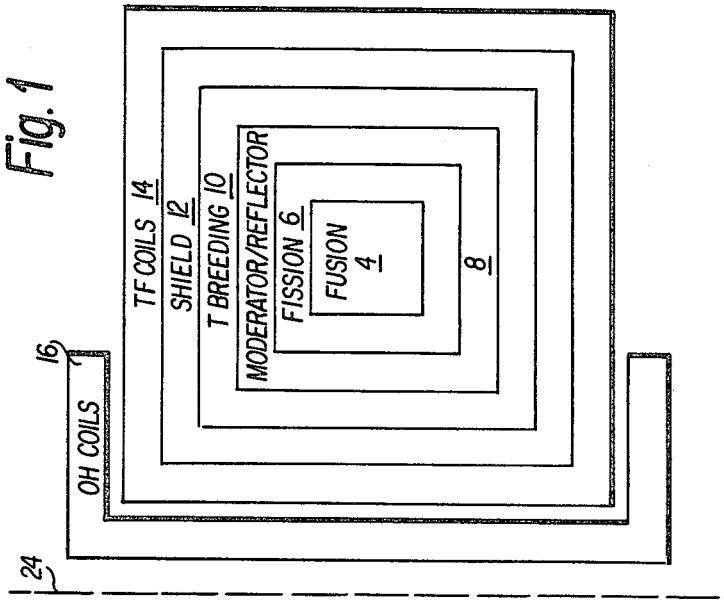
FIG. 1 is a block schematic diagram of prior art reactors.

FIG. 1 is a block diagram of prior art toroidal-type fusion-fission reactor designs. The figure illustrates a cross-sectional representative view of the toroid which is symmetric about a major axis 24. Typically, a toroidal fusion region 4 is provided for housing the fusion fuel which may be, for example, a mixture of deuterium and tritium. Surrounding the fusion region 4 is a fission blanket 6 which contains fissionable material such as natural uranium ($U^{238}$) or a uranium alloy. A moderator/reflector region 8 is also provided around the fission blanket 6 to slow down fast neutrons produced in both the fusion and fission regions and to reflect these neutrons as low energy neutrons back into the fission blanket 6. The resulting thermal neutrons within the fission blanket do not induce fission reactions in $U^{238}$ but rather are captured and lead to the production of fissile material, namely, $Pu^{239}$. After the moderator/reflector region 8 there is generally provided a T breeding section 10 which comprises lithium utilized to breed tritium via thermal and/or fast neutron capture. The tritium may then be utilized to replace tritium consumed by the d,t fusion reaction. Surrounding the T breeding section 10 is a shielding area 12. Toroidal field (TF) coils 14 surround and are protected by the shielding area 12 and are utilized to generate a toroidal field within the fusion region 4. Ohmic heating (OH) coils 16 are also illustrated adjacent the toroidal field coils 14 and are utilized to ohmically heat the plasma fusion region 4.

Figure 2B:
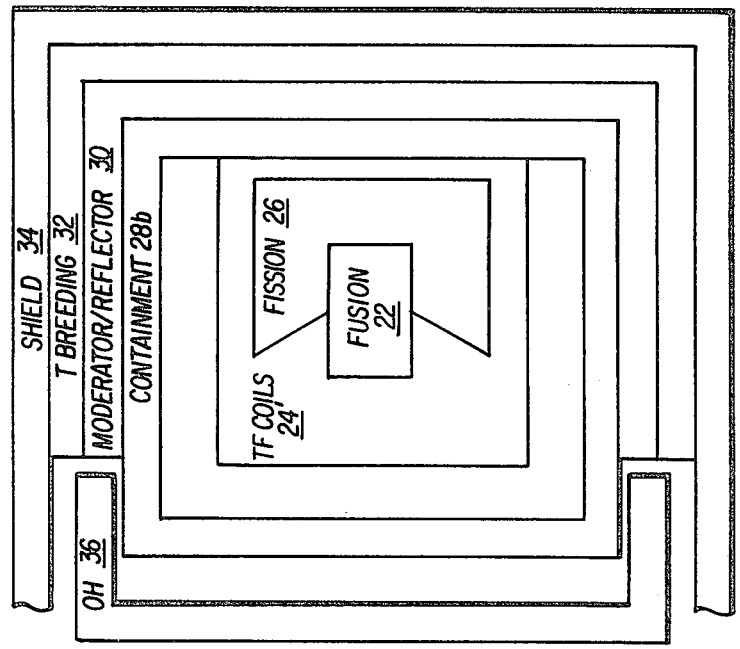
FIGS. 2A and 2B show block schematic diagrams of embodiments of the invention.
Figure 2A:
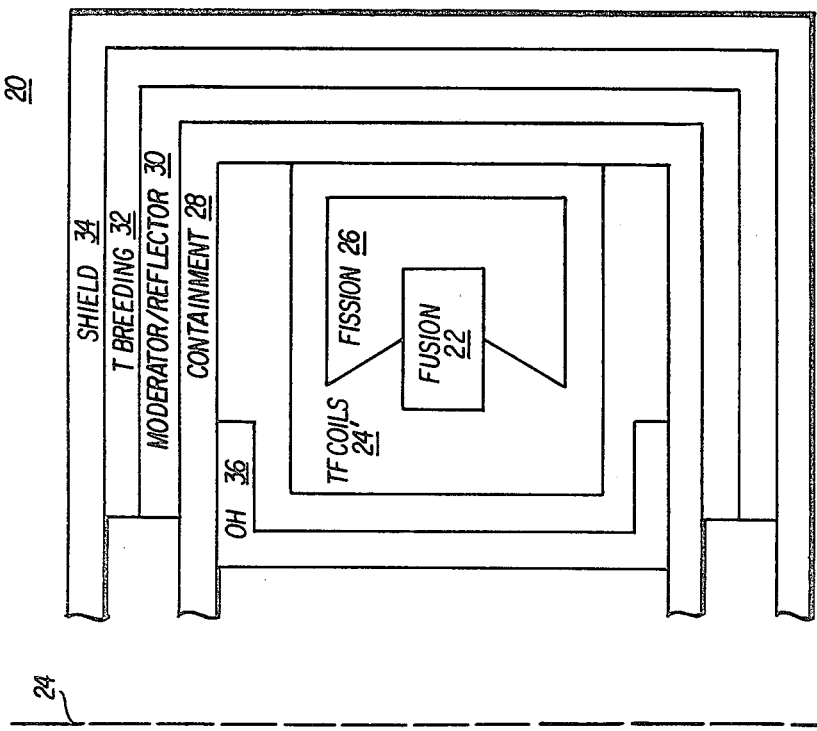

FIG. 2A is a schematic block diagram of a toroidal fusion device similar to FIG. 1 but illustrating the novel structural arrangement in accordance with the principles of the invention. Accordingly, a fusion-fission reactor 20 is illustrated comprising a fusion region 22 which is typically in the form of a toroid having a main axis 24. A plurality of toroidal field coils 24' are provided which have incorporated within a region thereof the fissile-fertile material 26. The fissile-fertile material 26, may, of example, comprise natural uranium, a uranium-molybdenum or uranium-zirconium alloy or the like. The fissile-fertile material is fissionable with respect to high energy neutrons produced from the fusion reaction and is fertile with respect to low energy neutrons thus producing additional fissile material. The particular structure of the toroidal field coils 24' and the fissile-fertile material 26 is described more fully below and may typically comprise an integral structure positioned substantially adjacent the fusion region 22 with only a vacuum vessel (and associated cooling panels) therebetween to house the plasma and cool the vacuum vessel first wall.

Surrounding the toroidal field coils 24' and fissile-fertile material 26 is a containment means 28 for housing the toroidal field coils 24'. The containment means 28 may be fabricated from stainless steel, copper or other metals and is provided with an insulative coating to prevent shorting of the TF coils. Also provided within the containment means 28 are the ohmic heating (OH) coils 36. Provisions are made for connecting the OH and TF coils to appropriate power supplies as is well known in the art. A moderator/reflector region 30, fabricated from graphite, for example, is also provided exterior to the containment means, and a T breeding section (lithium) 32 is positioned exterior of the moderator/reflector region 30. A shielding area 34 is also provided around the T breeding section 32.

FIG. 2B is another embodiment of the invention similar to FIG. 2A but shows the containment means 28b surrounding the TF coils 24 and fusion region 22 with the OH coils 36 outside thereof. OH coils 36 may also be enclosed in a separate containment means, not shown.

Figure 3:
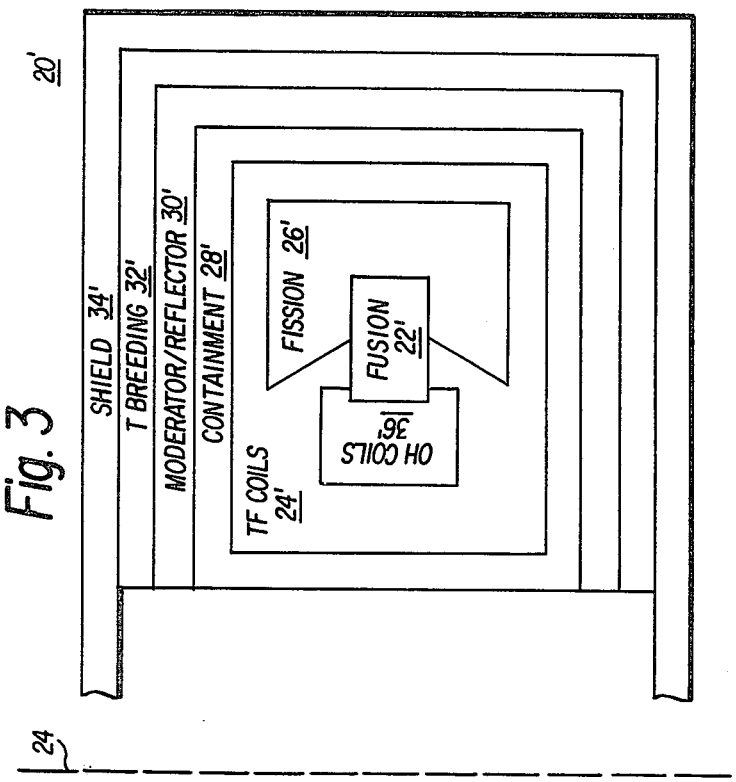
FIG. 3 is a block schematic diagram of yet another embodiment of the invention.

FIG. 3 illustrates yet another embodiment of the invention which is similar to that of FIG. 2 with the exception that the OH coils 36' are now positioned within the region of the toroidal field coils generally disposed in-between the fusion area 22' and the TF coils 34'. Elements similar to those in FIG. 2 are labeled with primes. The embodiment of FIG. 3 essentially frees the interior of the toroidal area near the main axis 24' of the traditional bulky OH coil transformer and provides for the efficient OH heating of the fusion region 22' by positioning the OH coils substantially adjacent the fusion region 22'. Additionally, the removal of the OH coils from the interior region of the toroid permits a more efficient design of the TF coils 24' by allowing for larger TF coil cross-sectional areas within this vicinity of the main axis 24 with substantial reduction in current densities. A resulting increase in TF magnetic strength is achieved which, coupled to a more efficient operation of the OH coils, enhances efficiency and stability of the operation of the fusion region 22'. Positioning the OH coils 36' within the region of the TF coils 24' is applicable to pure fusion toroidal-type reactors as well as the fusion-fission type.

Figure 4:
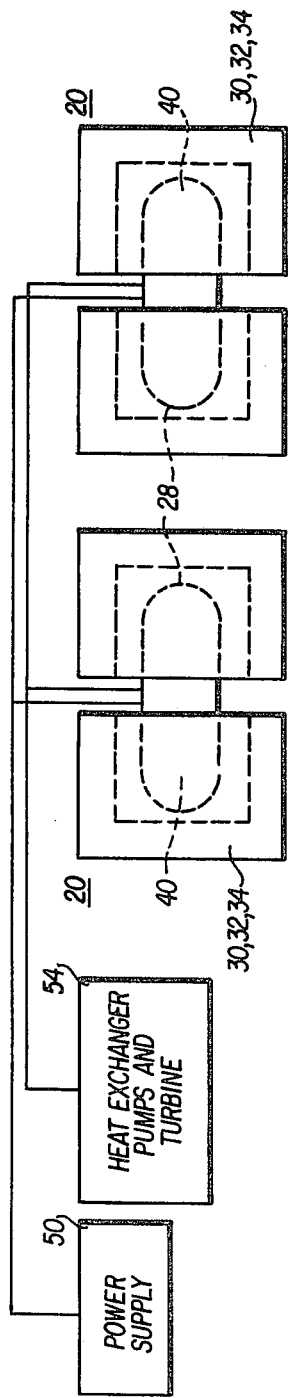
FIG. 4 is a block schematic diagram of a power generating device in accordance with the principles of the invention.

In operation of the fusion-fission power generating device there is typically provided a plurality of fusion-fission reactors as per FIGS. 2 or 3 interconnected in a power generating plant. Such a system is schematically depicted in FIG. 4. FIG. 4 is illustrated for the fusion-fission unit 20 of FIG. 2 although it is readily understood that a similar system could be operated with respect to the corresponding elements of FIG. 3. The containment means 28 together with everything contained therein, in particular, the OH coils 36, the toroidal field coils 24', the fissile-fertile material 26 and the fusion region 22, form a unit which may be identified as a fusion-fission power core (FFPC) 40. The FFPC core 40 is separable from the remaining elements of the fusion-fission reactor, namely, the moderator/reflector 30, T breeding section 32 and shielding area 34.

A unique advantage in accordance with the principles of the invention is that each of the fusion-fission reactors 20 is modular in the sense that the FFPC 40 may effectively be separated and removed from the remaining reactor elements for replacement by a replacement or substitute FFPC after the fissile-fertile material has been depleted to the extent that fission reactions no longer contribute in an optimum way to the overall energy production of the machine. Depending upon the operating parameters of the reactor 20, the fusion-fission power core 40 may be replaced on the order of yearly intervals.

FIG. 4 generally depicts the interconnection of the fusion-fission reactor to power supply means 50 and heat exchange, pumps and turbine apparatus 54. Power supply 50 is utilized to provide power to the OH and TF coils as well as power to auxiliary heating and equilibrium field coils (not shown) as are present in conventional Tokamak designs. The heat exchange, pumps and turbine apparatus 54 are generally interconnected to the fusion-fission power core 40 to extract thermal energy therefrom and simultaneously to cool the fusion-fission core during operation thereof. The overall interconnection of the fusion-fission power cores in a modular array to form a power generating plant may be similar to the modular fusion apparatus more fully illustrated in copending application entitled "Modular Fusion Power Apparatus Using Disposable Core", Ser. No. 841,903, incorporated herein by reference.

Figure 5:
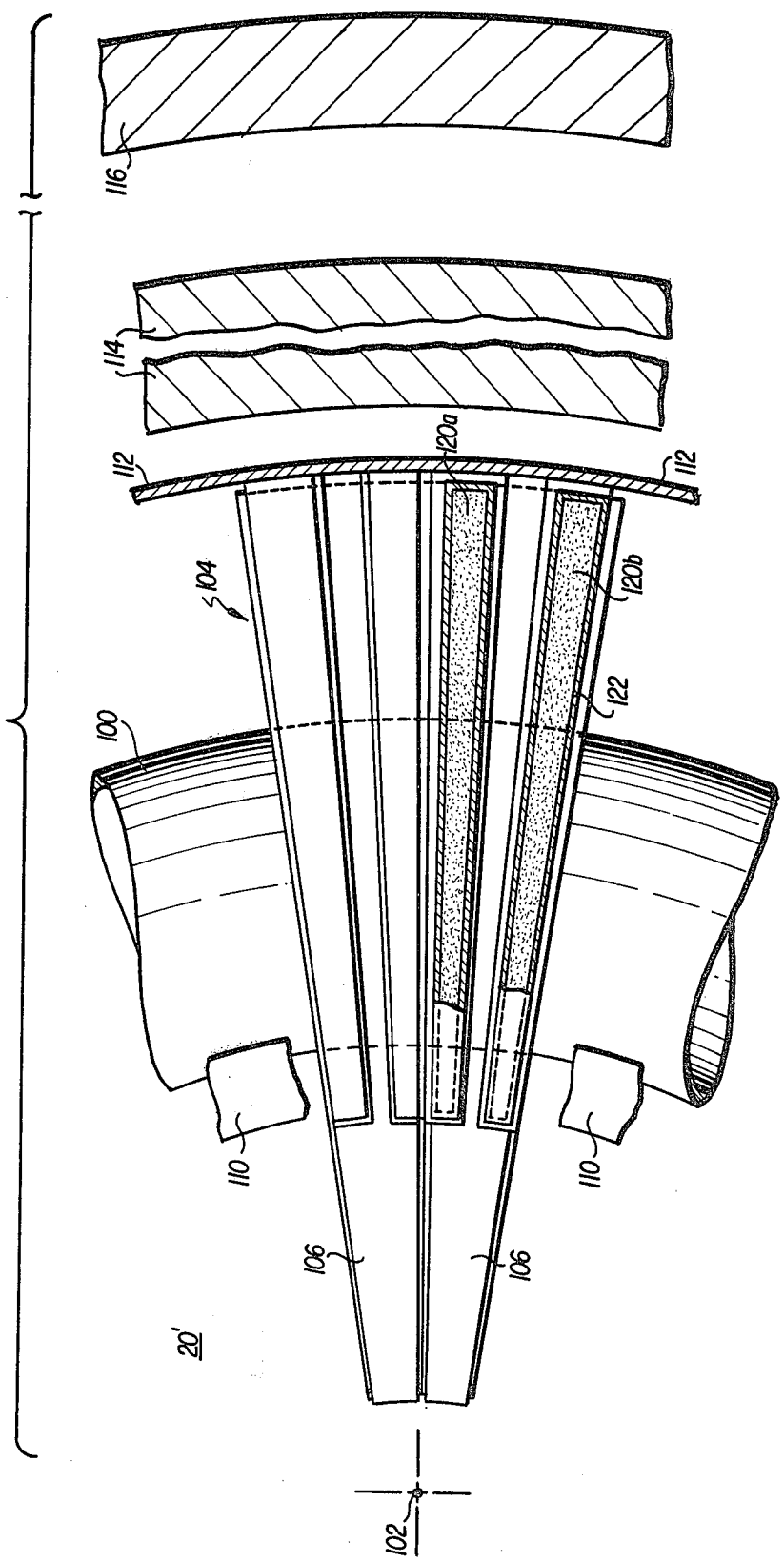
FIG. 5 is a partial plan view of the major components of the reactor in accordance with the principles of the invention.
Figure 6:
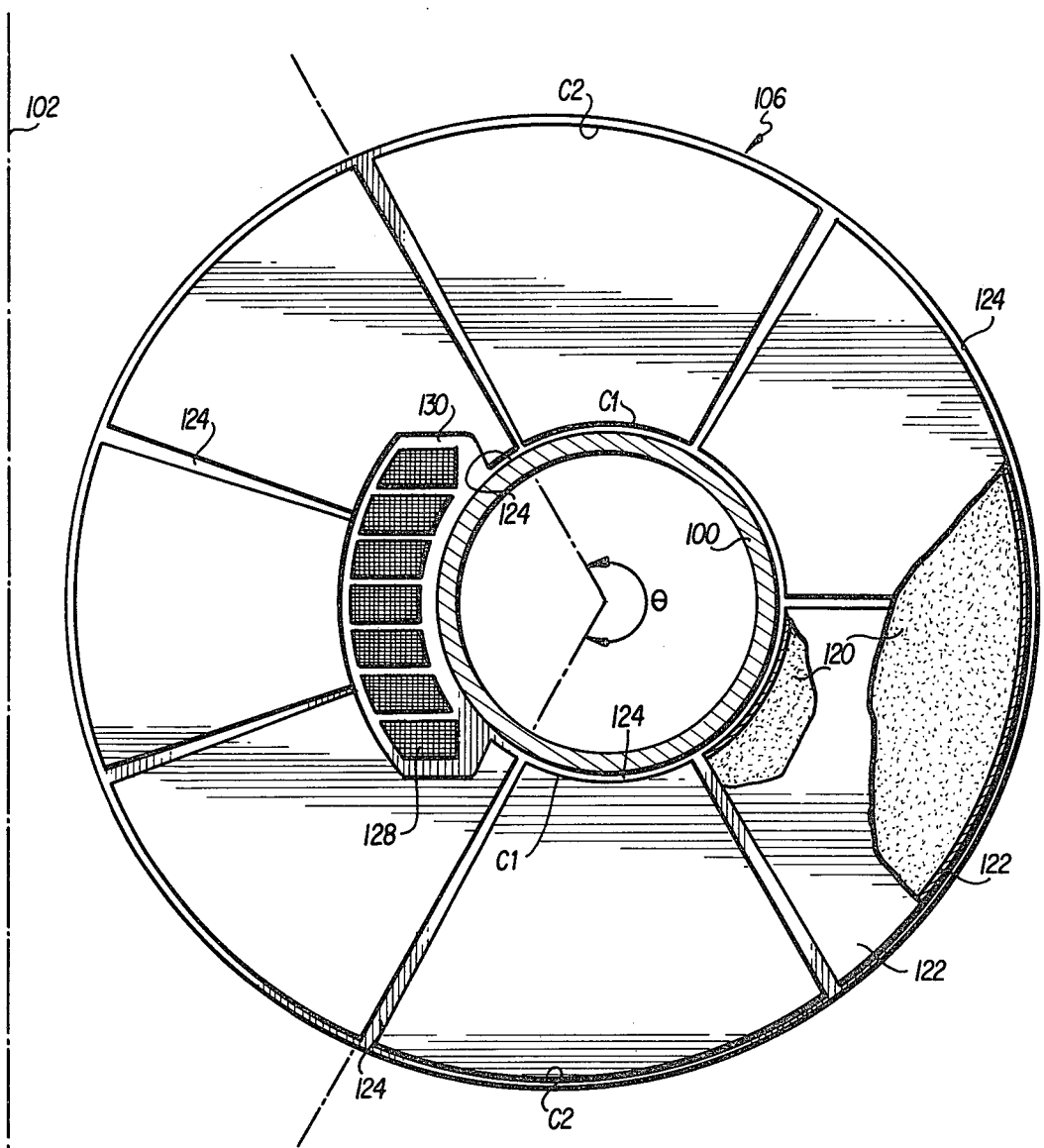
FIG. 6 is a side view of a toroidal field sector made in accordance with the invention.
Figure 7:
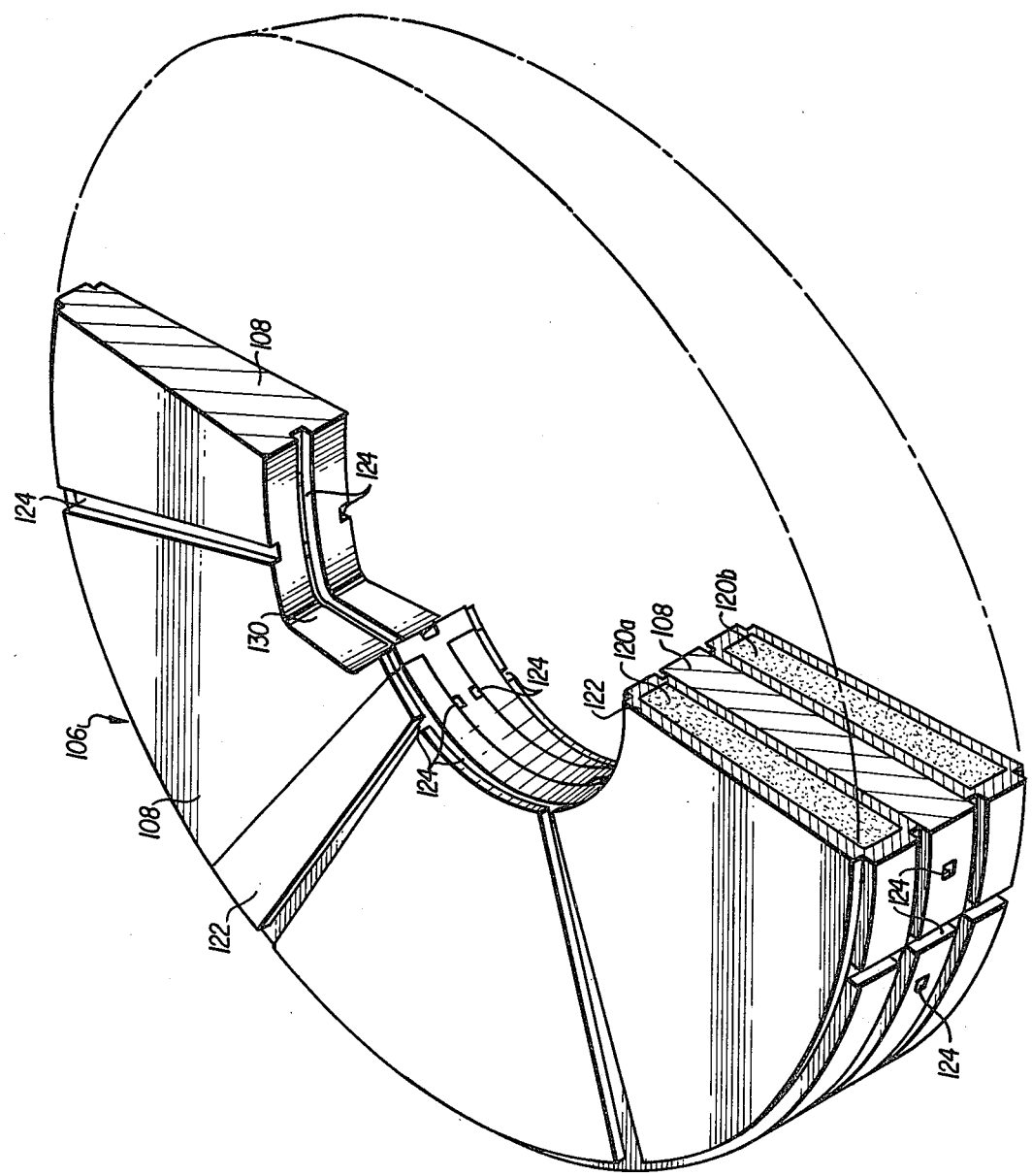
FIG. 7 is a perspective view of a toroidal field sector.

A more detailed illustration of the invention is shown in FIGS. 5-7. These figures depict the embodiment of FIG. 3 wherein the OH coils 36' are positioned interior of the toroidal field coils 24'. However, it is readily understood that the OH coils may be positioned as illustrated in FIG. 2 exterior of the TF coils as shown, for example, in the copending application referenced hereinabove. The structure of the toroidal field coils and the fissile-fertile material is substantially the same with the exceptions that the cut-out region for the OH coil within the TF coil structure is no longer present, and that the radial dimension of the TF coils toward the main axis of the toroid is reduced in order to allow space for the OH transformer in the region of the toroid main axis.

FIG. 5 is a top plan view of the portion of the fusion-fission reactor 20' wherein the main axis and center of the toroid is to the left in the drawing. The reactor comprises a plasma containment means 100 utilized to contain the fusion plasma gas, typically a mixture of deuterium and tritium. It is understood, however, that in addition to the d,t reaction additional fusion reactions may be utilized such as D,D or D,$He^3$ etc. The plasma containment means 100 is symmetric about the main axis 102. In both FIGS. 5 and 6, however, the main axis 102 is shown closer to the plasma containment means 100 than dictated by the scale factors of the drawing in order to illustrate in clear detail the novel toroidal field structure of the invention.

Surrounding the plasma containment means 100 is a toroidal field generating means generally indicated at 104 which comprises a plurality of TF sectors 106 each of which comprises the toroidal field coils 108. The main axis of the toroid defined by TF sectors 106 will typically coincide with the main axis of the containment means 100. FIG. 5 illustrates the OH coils 110, containment means 112, moderator/reflector 114 and T breeding section 116. The modulator/reflector 114 is shown segmented to indicate that it would typically be of a size larger than illustrated and would generally be on the order of the TF coil radius. Particular cooling and cladding of the modulator/reflector as well as the structure of the T breeding section 116 are well known in the art and are not shown for the sake of clarity.

In accordance with the novel aspects of the invention, the toroidal field sector 106 is seen to comprise a region of fissile-fertile material 120 such as, for example, natural uranium, or any of the uranium alloys such as uranium molybdenum, zirconium, etc. The fissile-fertile region within each of the TF sectors 106 is shown in the form of two separate regions namely, regions 120a and 120b, which effectively sandwich a portion of the TF coils 108 therebetween. Other arrangements are of course possible such as positioning the region 120 entirely on one side of the TF sectors 106. In reference to FIG. 6 it may be seen that the fissile-fertile material 120 does not extend completely around the TF sector 106 but rather is disposed primarily in the region away from the main axis 102. FIG. 6 illustrates that the fissile-fertile material region 120 is disposed around the TF sector 106 through an angle $\theta$ which may typically be on the order of 240°. It is additionally seen that the regions 120a and 120b optimumally extend to a region as close to the fusion region as possible to take maximum advantage of the neutron flux. Typically, the regions 120a and 120b extend from substantially the inner circumferential contour of the toroidal field coils 108 to substantially the outer circumferential contour thereof. These contours are shown by indicia C1 and C2 respectively.

The regions of fissile-fertile material 120a and 120b are encased in a cladding 122 which may typically be of stainless steel wherein there is provided a plurality of cooling channels (or grooves) 124. Cooling channels 124 are likewise provided throughout the TF coils 108, a few of which channels are illustrated in FIGS. 6 and 7. Because of the close proximity of the TF coils 108 to the plasma containment means 100, the entire region of the TF coils typically contains either radial cooling channels, as illustrated, or circumferential cooling channels if desired. These channels may be spaced on the order of a centimeter apart and may typically occur both within the TF coils 108 and on the cladding 122. As best illustrated in FIG. 6, these cooling channels may also be in fluid communication with a cut-out region 130 of the TF coils 108, to thereby cool the OH coils 128 which are illustrated as being inserted within cut-out region 130.

As a representative example of the dimensions of the apparatus of FIGS. 5-7, the toroid radius to the center of the plasma may be on the order of 50-100 cm, the plasma radius 20-50 cm, moderator/reflector region thickness 10-30 cm and the lithium T breeding section a distance from the center of the plasma on the order of 300 cm. The volume fraction of $U^{238}$ to Cu in the TF coils may typically be from 5-50%. For a plasma center taken as the origin, calculations using a cylindrical model geometry have shown a favorable selection of parameters as follows: plasma radius, approximately 23 cm; inner and outer radius of $U^{238}$-Cu region of TF coil, 23 cm and 33 cm respectively; inner and outer radius of moderator/reflector region, approximately 33 cm and 48 cm respectively; and lithium T breeding section extending from 300 cm to approximately 400 cm from the origin. The volume fraction of $U^{238}$ to copper is optimumally 20%, and number densities for $U^{238}$ and Cu may be taken as $8.7 \times 10^{21}/cm^3$ and $6.3 \times 10^{22}/cm^3$ respectively.

Particular details in regard to the structure of cooling channels for blanket regions as well as TF coil structures per se have been the subject of many studies in the prior art and reference is made to the aforementioned Review Meeting and Proceedings for additional details with respect thereto. Additional prior art toroidal coil designs are illustrated in U.S. Pat. Nos. 3,859,615 and 3,303,449 and cooling configurations for blanket regions and the like are well known in the art, such as, for example, Volume I and II of *Tokamak Experimental Power Design Conceptual Design*, Argon National Laboratory, August 1976, ANL/CTR-76-3. Additionally, it is pointed out that the plasma containment region 100 although illustrated as a simple shell in practice may contain a coolant panel in fluid communication with the radial or circumferential cooling channels 124 within the TF coils 108 and cladding 122. Reference is made to the aforementioned ANL publication as representative of a typical design in relation to the vacuum vessel and coolant panel corresponding to the plasma containment means 100.

Although the plasma containment means 100 is illustrated as having a circular cross-sectional area, it is understood that additional designs recognized in the art are also possible, such as, for example, the D configuration well known in Tokamak studies. The corresponding TF generating means 104 is naturally designed consistent with the shape of the plasma containment means 100. Of particular significance with respect to the invention is, however, that the TF coils 10 be positioned substantially adjacent (consistent with first wall loading and cooling requirements) to the plasma containment means 100 and additionally that the region of fissile-fertile material 120 is also positioned substantially adjacent to the plasma containment means 100. This particular arrangement allows optimization of the fusion-fission reaction and produces an extremely large burn up of the uranium fuel. This close proximity of the TF coil sectors 106 and the fissile-fertile region 120 to the fusion area permits a high fission-to-fusion energy production ratio on the order of 10:1.

This high ratio of fission to fusion energy allows operation of the FFPC at gross fusion power levels significantly less than those which would be required for operation of a pure fusion power device—in particular, FFPC lifetimes, as limited by radiation damage by fusion neutrons, may be ten or more times greater for the same net nuclear energy output (fission plus fusion) than for fusion alone. Thus, this invention allows operation over FFPC lifetimes as high as one to two years. Over such long time periods the high fusion neutron flux will result in large burnup utilization of the $U^{238}$ in the coils, in proximity to the plasma. Indeed, calculations indicate that as much as 80% of the uranium should be fissioned in the first three centimenters of the fissile-fertile region 120 nearest the plasma containment means 100. Average burn up percentages are on the order of 50%.

In operation of the fusion-fission reactor or power generating means, high energy neutrons on the order of 14 Mev are generated by the d,t reaction within the plasma containment means 100. These neutrons cause fission of $U^{238}$ within the regions 120. The fission reactions generate fission fragments plus large amounts of energy on the order of 200 Mev/fission. Additionally, the fission reactions caused by fusion neutrons generate up to 4.5 neutrons per fission with neutron energies in the range of 1–5 Mev. These neutrons in turn generate slight additional fission reactions with $U^{238}$. Neutrons which escape the TF sectors 106 are slowed down in the moderator/reflector 114 and are refelected back into the fissile-fertile regions 120 wherein these low energy neutrons are captured by $U^{238}$ which eventually decays to $Pu^{239}$. The $Pu^{239}$, in turn, is fissile and thus fissions upon reactions with thermal neutrons (as well as fast neutrons). $Pu^{239}$ eventually reaches a saturation level which is sufficient to contribute significantly to the overall energy production of the reactor.

The particular composition and thickness of the moderator/reflector is selected to slow down and reflect neutrons into the fissile-fertile material at energies which optimize overall energy production of the reactor. The terminology "low energy neutrons" as utilized in the appended claims thus is intended to cover such neutron energies. For example, epithermal neutrons are expected to have large cross sections for n capture, and known resonance peaks in $U^{238}$ extend generally in the range of 6–200 ev. Thermal neutrons will also contribute to $Pu^{239}$ production.

An important aspect of the design of the fusion-fission reactor in accordance with the principles of the invention is in the positioning of the TF coils substantially adjacent the toroidal fusion region. Thus, while there is typically a vacuum chamber containing the plasma of the fusion region and while there may generally be a cooling region provided to cool the chamber first wall, the TF coils are positioned adjacent any such cooling region such that they are substantially adjacent to the fusion region itself. The positioning of the TF coils substantially adjacent the fusion region and the provision for positioning the fissile-fertile material in the region of the TF coils is a sharp contrast to prior art designs. It is clear that the terminology of placing the fissile-fertile material "within the region of the TF coils" does not require that the material coincide in a spatial sense with the electrically conductive coil material (copper, for example). The fissile-fertile material typically will be a distinct region positioned within the region defined between the inner and outer circumferential contour of the TF coils.

With respect to the OH coils, it is clear that these coils likewise are positioned substantially adjacent the fusion region but are located on the side of the toroidal fusion region nearest the main axis thereof.

Although the invention has been described in terms of selected preferred embodiments, the invention should not be deemed limited thereto since other embodiments and modifications will readily occur to one skilled in the art. It is therefore to be understood that the appended claims are intended to cover all such modifications as fall within the true spirit and scope of the invention.

I claim:

1. A fusion-fission reactor having a plasma containing toroidal fusion region for producing high energy neutrons from fusion reactions and a region external to said fusion region containing material which is both fissile with respect to high energy neutrons and fertile with respect to low energy neutrons, said reactor comprising:
   (a) An electromagnetic toroidal field generating means having inner and outer structural contours;
   (b) a region of fissile-fertile material positioned within said inner and outer structural contours of said toroidal field generating means and constituting a portion thereof; and
   (c) said toroidal field generating means positioned substantially adjacent said toroidal fusion region.

2. A fusion-fission reactor as recited in claim 1 further comprising moderator/reflector means positioned proximate said toroidal field generating means to moderate and reflect said high energy neutrons into said region of said fissile-fertile material.

3. A fusion-fission reactor as recited in claim 2 wherein said moderator/reflector means is positioned exterior of said toroidal field generating means.

4. A fusion-fission reactor as recited in claim 1 wherein said toroidal field generating means comprises a plurality of toroidal field coils forming a toroid about said toroidal fusion region and said fissile-fertile material is positioned within the region of said toroidal field coils and generally on the side away from a main axis of said toroidal fusion region.

5. A fusion-fission reactor as recited in claim 4 wherein said fissile-fertile material forms discrete regions within said plurality of toroidal field coils and extends from approximately an inner circumferential contour of said toroidal coils to approximately an outer circumferential contour thereof on the side generally away from the main axis of said toroidal fusion region.

6. A fusion-fission reactor as recited in claim 5 wherein said fissile-fertile material comprises $U^{238}$.

7. A fusion-fission reactor as recited in claim 6 wherein said fusion region contains deuterium and tritium.

8. A fusion-fission reactor as recited in claim 5 wherein said fissile-fertile material comprises $Th^{232}$.

9. A fusion-fission reactor as recited in claim 4 wherein said plurality of toroidal field coils form segments of said toroidal field generating means and said region of said fissile-fertile material comprises between 5% and 50% by volume of said segments.

10. A fusion-fission reactor as recited in claim 9 wherein said region of fissile-fertile material comprises approximately 20% by volume of said segments.

11. A fusion-fission reactor as recited in claim 9 wherein said regions of said material are positioned on opposite sides of each segment with a region of electrically conductive material disposed therebetween.

12. A method of increasing the efficiency of operation of a fusion-fission device having a plasma containing fusion region for generating high energy neutrons from fusion reactions and a region exterior to said fusion region containing material which is both fissile with respect to high energy neutrons and fertile with respect to low energy neutrons, comprising the steps of:

(a) positioning electromagnetic toroidal field generating means having inner and outer structural contours substantially adjacent said toroidal fusion region; and (b) incorporating said fissile-fertile material within said inner and outer structural contours of said toroidal field generating means and within a portion thereof.

* * * * *

UNITED STATES PATENT AND TRADEMARK OFFICE
CERTIFICATE OF CORRECTION

PATENT NO. : 4,370,295
DATED : January 25, 1983
INVENTOR(S) : Robert W. BUSSARD

It is certified that error appears in the above—identified patent and that said Letters Patent is hereby corrected as shown below:

Column 4, line 28, delete "FFPC core" and insert therefor
-- FFPC --.

Column 3, lines 66-67, delete "TF coils 34'" and insert therefor -- TF coils 24' --.

Signed and Sealed this

Seventh Day of June 1983

[SEAL]

Attest:

DONALD J. QUIGG

Attesting Officer

Acting Commissioner of Patents and Trademarks